J. T. Hancock,
Steam Blower
No. 93,197.    Patented Aug. 3, 1869.
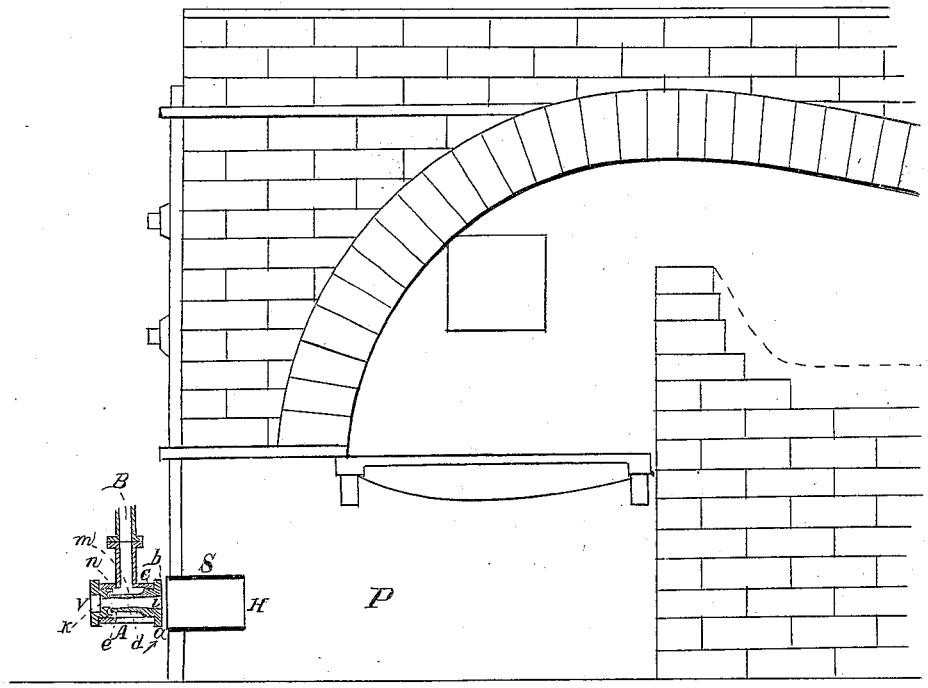
Witnesses
John Howarth
Carroll D. Wright.
John T. Hancock

United States Patent Office.

JOHN T. HANCOCK, OF JAMAICA PLAIN, MASSACHUSETTS.

Letters Patent No. 93,197, dated August 3, 1869; antedated July 22, 1869.

IMPROVEMENT IN STEAM-BLOWERS.

The Schedule referred to in these Letters Patent and making part of the same.

*To all whom it may concern:*

Be it known that I, JOHN T. HANCOCK, of Jamaica Plain, in the county of Norfolk, and State of Massachusetts, have invented certain Improvements in Steam-Blowers; and I do hereby declare that the following is a full, clear, and exact description thereof, reference being had to the accompanying drawings, in which are represented a furnace, and the manner of applying my invention, for the purpose of a steam-blower to the fire.

The object of this invention is to produce a steam-blower which shall give an increased density of blast, an increased quantity of air, and a more perfect mixture of air and steam, with same amount of steam used in other steam-blowers.

My invention consists in the combination of an apparatus for which I applied for Letters Patent, September 17, 1868, and a mixing-chamber. The action and operation of this apparatus are fully and clearly explained in the application referred to, the subject of which application was an "apparatus for inducing motion in mobile bodies."

The construction of this apparatus is as follows:

A is a cylinder.
B, induction-pipe at right angles with A.
C is a concentric tube, smaller than A.
E is a plug, closely fitted into A.
On the face of E is annular recess $n\ n$.
K is a conical central orifice in E.
$m$ is a space around C.
$n$ is a continuation of $m$.
S is a mixing-chamber, situated in advance of $i$.

Steam from the boiler passes through B, enters space $m$, passes around through recess $n$ into $e$, where it takes with it air through $v\ k$, mixes in $e\ d$, and the combined air and steam is ejected at $i$, into mixing-chamber S, where the force of combined air and steam, blowing through chamber S from $i$, takes an additional supply of air, through space $a\ b$, between the mixing-chamber S and the apparatus, into S, where it combines with the air and steam from $i$. The result of this is, that a more dense blast, an increased quantity of air, and a more perfect mixture of air and steam are ejected into the ash-pit P, under the fires, than are obtained by an equivalent use of power in other steam-blowers.

What I claim, therefore, as my invention, and desire to secure by Letters Patent, is—

The apparatus described, in combination with mixing-chamber S, as described and specified.

In testimony whereof, I have signed my name to this specification, in the presence of two subscribing witnesses.

JOHN T. HANCOCK.

Witnesses:
JOHN HOWARTH,
CARROLL D. WRIGHT.